(12) United States Patent
Okada et al.

(10) Patent No.: US 10,558,140 B2
(45) Date of Patent: Feb. 11, 2020

(54) LEAF SPRING, HOUSING, LIGHT SCANNING APPARATUS, AND IMAGE FORMING APPARATUS

(71) Applicant: CANON KABUSHIKI KAISHA, Tokyo (JP)

(72) Inventors: Yuta Okada, Moriya (JP); Hitoshi Iwai, Abiko (JP); Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/908,482

(22) Filed: Feb. 28, 2018

(65) Prior Publication Data

US 2018/0259874 A1 Sep. 13, 2018

(30) Foreign Application Priority Data

Mar. 10, 2017 (JP) .................................. 2017-046525

(51) Int. Cl.
| | | |
|---|---|---|
| *G02B 26/12* | (2006.01) | |
| *G03G 15/043* | (2006.01) | |
| *G03G 15/04* | (2006.01) | |
| *G03G 15/01* | (2006.01) | |
| *G02B 7/182* | (2006.01) | |

(52) U.S. Cl.
CPC ......... *G03G 15/0435* (2013.01); *G02B 7/182* (2013.01); *G02B 26/125* (2013.01); *G03G 15/011* (2013.01); *G03G 15/04072* (2013.01); *G03G 2215/0404* (2013.01)

(58) Field of Classification Search
CPC ............. G03G 15/0435; G03G 15/011; G03G 15/04072; G03G 2215/0404; G02B 7/182; G02B 26/125
See application file for complete search history.

(56) References Cited

U.S. PATENT DOCUMENTS

| 7,072,087 | B2 | 7/2006 | Nakahata | 359/204.1 |
| 7,298,390 | B2 | 11/2007 | Nakahata | 347/231 |
| 7,522,326 | B1 | 4/2009 | Otoguro | 347/256 |
| 7,629,992 | B2 | 12/2009 | Nakahata | 347/243 |
| 7,684,099 | B2 | 3/2010 | Otoguro | 359/216.1 |
| 7,728,861 | B2 | 6/2010 | Nakahata | 347/231 |
| 7,830,576 | B2 | 11/2010 | Nakahata | 359/201.1 |

(Continued)

FOREIGN PATENT DOCUMENTS

JP H06-148550 5/1994

OTHER PUBLICATIONS

U.S. Appl. No. 15/702,219, filed Sep. 12, 2017.
(Continued)

*Primary Examiner* — Sharon A. Polk
(74) *Attorney, Agent, or Firm* — Venable LLP

(57) ABSTRACT

A leaf spring configured to mount an optical element to a housing, the housing containing: a rotary polygon mirror configured to deflect a laser beam emitted from a light source; and the optical element configured to guide the laser beam deflected by the rotary polygon mirror to a member to be scanned, wherein an adhesive is applied to the leaf spring, the adhesive being configured to adhere separated material scraped from the housing, the separated material being scraped from the housing by rubbing between the leaf spring and the housing at a time of mounting the optical element to the housing.

10 Claims, 13 Drawing Sheets

(56) References Cited

U.S. PATENT DOCUMENTS

| | | | |
|---|---|---|---|
| 8,810,622 B2 | 8/2014 | Mamiya et al. | 347/242 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Ishidate et al. | G03G 15/043 |
| 2009/0067862 A1* | 3/2009 | Nakamura | G03G 15/0435 399/51 |
| 2009/0244670 A1 | 10/2009 | Sato et al. | 359/205.1 |
| 2010/0099240 A1* | 4/2010 | Watanabe | C09J 7/385 438/464 |
| 2011/0067041 A1* | 3/2011 | Akutsu | G11B 7/22 720/703 |
| 2012/0081770 A1 | 4/2012 | Sato et al. | 359/204.1 |
| 2015/0002594 A1* | 1/2015 | Ishidate | G02B 26/125 347/118 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/891,087, filed Feb. 7, 2018.
U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/891,057, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/889,052, filed Feb. 5, 2018.
U.S. Appl. No. 15/891,080, filed Feb. 7, 2018.
U.S. Appl. No. 15/718,510, filed Sep. 28, 2017.

* cited by examiner

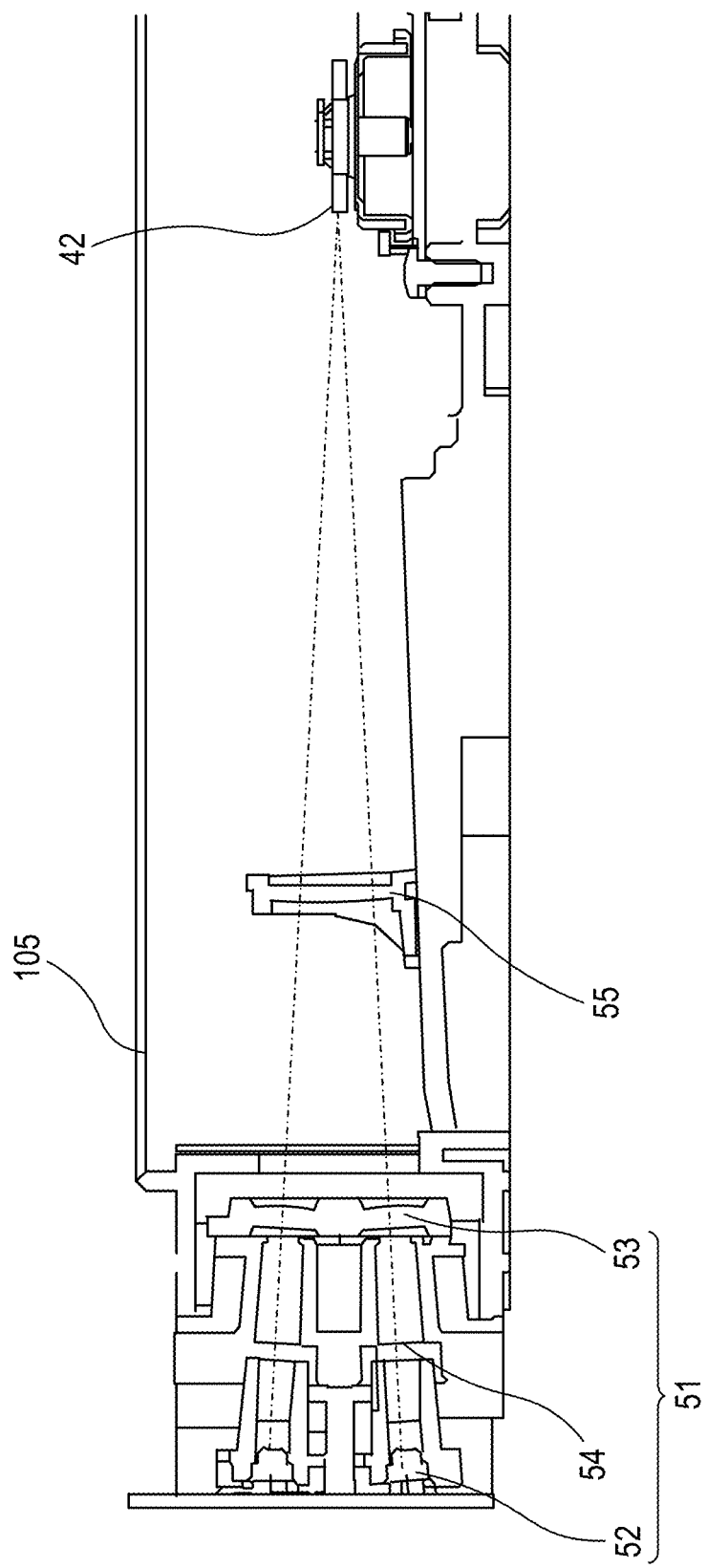

LEAF SPRING, HOUSING, LIGHT SCANNING APPARATUS, AND IMAGE FORMING APPARATUS

BACKGROUND OF THE INVENTION

Field of the Invention

The present invention relates to a leaf spring, a housing, a light scanning apparatus, and an image forming apparatus.

Description of the Related Art

As a light scanning apparatus to be used in an electrophotographic image forming apparatus, a light scanning apparatus having the following configuration is well known. Specifically, there has been known a light scanning apparatus configured to form a latent image on a photosensitive member by deflecting a light beam emitted from a light source with a rotary polygon mirror and guiding the deflected light beam onto a photosensitive surface of the photosensitive member with optical components such as a lens and a mirror.

Inside the light scanning apparatus, there is provided a deflector including the rotary polygon mirror for performing deflection scanning with laser beams guided from a semiconductor laser, for example, the rotary polygon mirror. This forms a mechanism in which the semiconductor laser is repeatedly turned on and off in accordance with operation of a photosensitive drum while laser beams are scanned on the photosensitive drum to obtain a desired latent image.

Normally, optical components forming such a mechanism are stored in a housing so as to be protected from dart-causing substances. However, there has been a problem in that the housing is scraped off by the operation of mounting a variety of components to generate a separated material separated from the housing and the separated material adheres to the optical component. In order to deal with this problem, for example, there has been proposed a technology of collecting the separated material and the like with use of an adhesive applied onto the bottom surface and the side surface of the housing (Japanese Patent Application Laid-Open No. H06-148550).

In the related art, however, the adhesive is applied almost throughout the bottom surface and the side wall inside the housing except a circuit board for driving a polygon mirror. That is, the related art has the problem in that the adhesive is to be extensively applied onto places to which the separated material may move.

SUMMARY OF THE INVENTION

The present invention has been made in such circumstances, and an object of the present invention is to collect a separated material with use of a smaller amount of adhesive than in the related art.

In order to solve the above-mentioned problem, according to one embodiment of the present invention, there is provided a leaf spring configured to mount an optical element to a housing, the housing containing: a rotary polygon mirror configured to deflect a laser beam emitted from a light source; and the optical element configured to guide the laser beam deflected by the rotary polygon mirror to a member to be scanned, wherein an adhesive is applied to the leaf spring, the adhesive being configured to adhere separated material scraped from the housing, the separated material being scraped from the housing by rubbing between the leaf spring and the housing at a time of mounting the optical element to the housing.

Further features of the present invention will become apparent from the following description of exemplary embodiments with reference to the attached drawings.

BRIEF DESCRIPTION OF THE DRAWINGS

FIG. 3 is an expanded view from a light source to a deflector in the light scanning apparatus according to the first to third embodiments.

DESCRIPTION OF THE EMBODIMENTS

Now, embodiments of the present invention are described in detail with reference to the drawings. In the following description, a rotation axis direction of a rotary polygon mirror 42 of a deflector 43, which is to be described later, is defined as a Z-axis direction, a main scanning direction, which is a scanning direction of a light beam, or a longitudinal direction of optical lenses and reflection mirrors 62, which are to be described later, is defined as a Y-axis direction, and a direction orthogonal to a Y axis and a Z axis is defined as an X-axis direction.

[First Embodiment]

<Configuration of Image Forming Apparatus>

Figure 1:
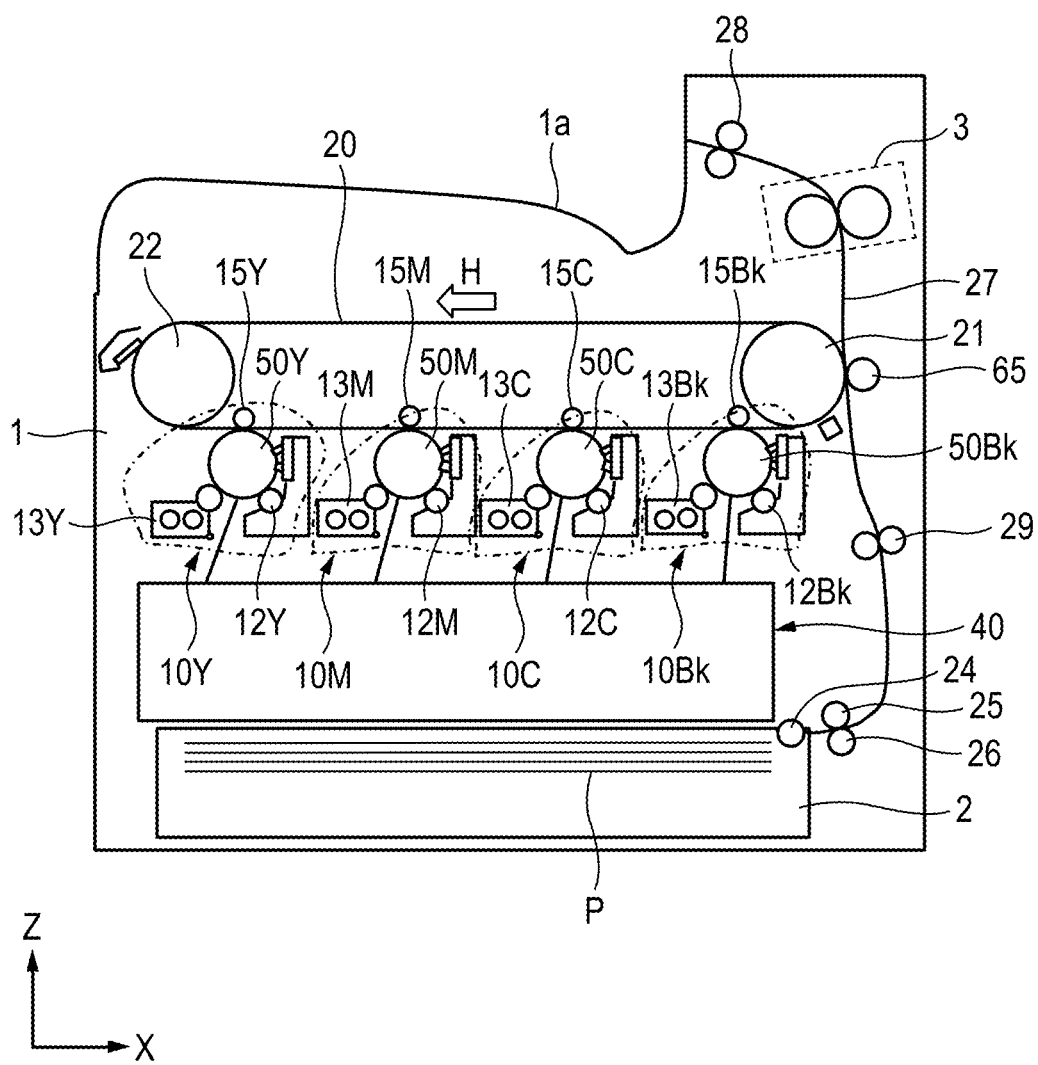
FIG. 1 is a schematic view of an image forming apparatus according to a first to third embodiments of the present invention.

The configuration of an image forming apparatus according to a first embodiment of the present invention will be described. FIG. 1 is a schematic structural view for illustrating an entire configuration of a tandem type color laser beam printer of the first embodiment. The laser beam printer (hereinafter referred to simply as "printer") includes four image forming engines 10Y, 10M, 10C, and 10Bk (indicated by the dashed-dotted lines) configured to form toner images for respective colors of yellow (Y), magenta (M), cyan (C), and black (Bk). Further, the printer includes an intermediate transfer belt 20 serving as an intermediate transfer member onto which a toner image is transferred from each of the image forming engines 10Y, 10M, 10C, and 10Bk. The toner images multiply transferred onto the intermediate transfer belt 20 (intermediate transfer member) are configured to be transferred onto a recording sheet P serving as a recording medium so that a full-color image is formed. In the following, unless otherwise necessary, the reference symbols Y, M, C, and Bk indicating the colors are omitted.

The intermediate transfer belt 20 is formed into an endless shape and is carried over a pair of belt conveyance rollers 21 and 22 so that a toner image formed by each image forming engine 10 is transferred onto the intermediate transfer belt 20 while the intermediate transfer belt 20 is rotating in a direction indicated by the arrow H. Further, a secondary transfer roller 65 serving as a second transfer member is provided at a position opposed to one belt conveyance roller 21 across the intermediate transfer belt 20. The recording sheet P is inserted between the secondary transfer roller 65 and the intermediate transfer belt 20 that are held in press-contact with each other, with the result that a toner image is transferred onto the recording sheet P from the intermediate transfer belt 20. The four image forming engines 10Y, 10M, 10C, and 10Bk described above are arranged in parallel on a lower side of the intermediate transfer belt 20 so that a toner image formed in accordance with image information of each color is transferred onto the intermediate transfer belt 20 (hereinafter referred to as "primary transfer"). The four image forming engines 10 are arranged in the following order: the image forming engine 10Y for yellow, the image forming engine 10M for magenta, the image forming engine 10C for cyan, and the image forming engine 10Bk for black in a rotation direction (direction indicated by the arrow H) of the intermediate transfer belt 20.

Further, a light scanning apparatus 40 configured to expose a photosensitive drum (photosensitive member) 50 to light in accordance with image information is provided below the image forming engines 10, the photosensitive drum 50 being a member to be scanned that is included in each image forming engine 10. The light scanning apparatus 40 is shared by all of the image forming engines 10Y, 10M, 10C, 10Bk and includes four semiconductor lasers serving as light sources (not shown) configured to emit laser beams (light beams) that are each modulated in accordance with image information of each color. Further, the light scanning apparatus 40 includes a rotary polygon mirror unit (hereinafter referred to as "deflector") 43 that rotates at a high speed to perform scanning with laser beams of the four optical paths along the direction of the rotary shaft of the photosensitive drum 50 (FIG. 2B). Each laser beam used in scanning by the deflector 43 travels along a predetermined route while being guided by an optical element mounted in the light scanning apparatus 40. Each laser beam having traveled along the predetermined route exposes each photosensitive drum 50 of each image forming engine 10 through a dustproof glass 142 (FIG. 2B) that is an irradiation port provided on the top of the light scanning apparatus 40.

Further, each image forming engine 10 includes the photosensitive drum 50 and a charging roller 12 configured to charge the photosensitive drum 50 to a uniform background potential. Further, each image forming engine 10 includes a developing device (developing unit) 13 configured to form a toner image by developing an electrostatic latent image formed on the photosensitive drum 50 (member to be scanned) by exposure to the laser beam. The developing device 13 forms a toner image in accordance with image information of each color on the photosensitive drum 50 serving as the photosensitive member. The developing device 13 has a system using a two-component developer with a toner and a carrier mixed therein. The developing device 13 is supplied with the developer having the toner and the carrier mixed therein from a supply cartridge (not shown) so as to omit maintenance of replacing the developer due to a temporal change. For the developing device 13, a development system to automatically discharge a degraded developer is used.

A primary transfer roller 15 serving as a first transfer member is provided at a position opposed to the photosensitive drum 50 of each image forming engine 10 across the intermediate transfer belt 20. When a predetermined transfer voltage is applied to the primary transfer roller 15, a toner image on the photosensitive drum 50 is transferred onto the intermediate transfer belt 20.

Meanwhile, the recording sheet P is supplied from a feed cassette 2 housed in a lower portion of a printer housing 1 to an inner portion of the printer, specifically a secondary transfer position at which the intermediate transfer belt 20 and the secondary transfer roller 65 come into abutment with each other. In an upper portion of the feed cassette 2, a pickup roller 24 configured to pull out the recording sheet P contained in the feed cassette 2 and a feed roller 25 are arranged in parallel. Further, a retard roller 26 configured to prevent overlap feeding of the recording sheet P is provided at a position opposed to the feed roller 25. A conveyance route 27 of the recording sheet P inside the printer is provided substantially vertically along a right side surface of the printer housing 1. The recording sheet P pulled out from the feed cassette 2 positioned in a bottom portion of the printer housing 1 ascends through the conveyance route 27 and is sent to registration rollers 29 configured to control an entry timing of the recording sheet P with respect to the secondary transfer position. After that, a toner image is transferred onto the recording sheet P at the secondary transfer position, and then the recording sheet P is sent to a fixing device 3 serving as a fixing unit (indicated by the broken line) provided on a downstream side in the conveyance direction. An unfixed toner image on the sheet P (recording medium) is fixed onto the sheet P by the fixing device 3. The recording sheet P having the toner image fixed thereonto by the fixing device 3 is discharged to a discharge tray 1a provided on the top of the printer housing 1 through discharge rollers 28.

In formation of a full-color image by the color laser beam printer configured as above, first, the light scanning apparatus 40 exposes the photosensitive drum 50 of each image forming engine 10 to light at predetermined timing in accordance with image information of each color. With this, a latent image in accordance with the image information is formed on the photosensitive drum 50 of each image forming engine 10. In order to obtain an image of good quality, the latent image formed by the light scanning apparatus 40 needs to be reproduced with accuracy at a predetermined position on the photosensitive drum 50.

<Configuration of Light Scanning Apparatus>

Figure 2A:
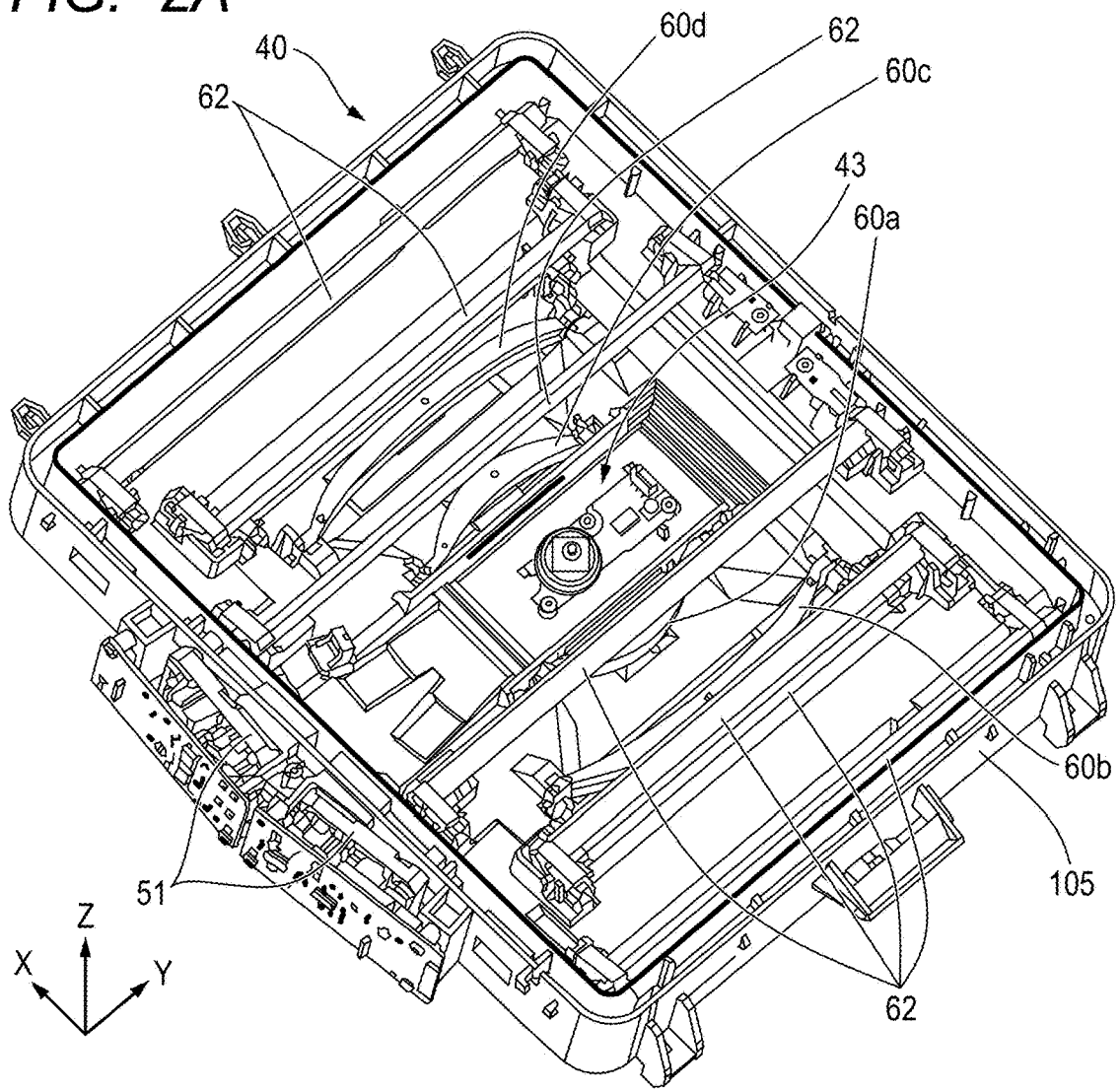
FIG. 2A and FIG. 2B are a perspective view and a sectional view of a light scanning apparatus according to the first to third embodiments, respectively.
Figure 2B:
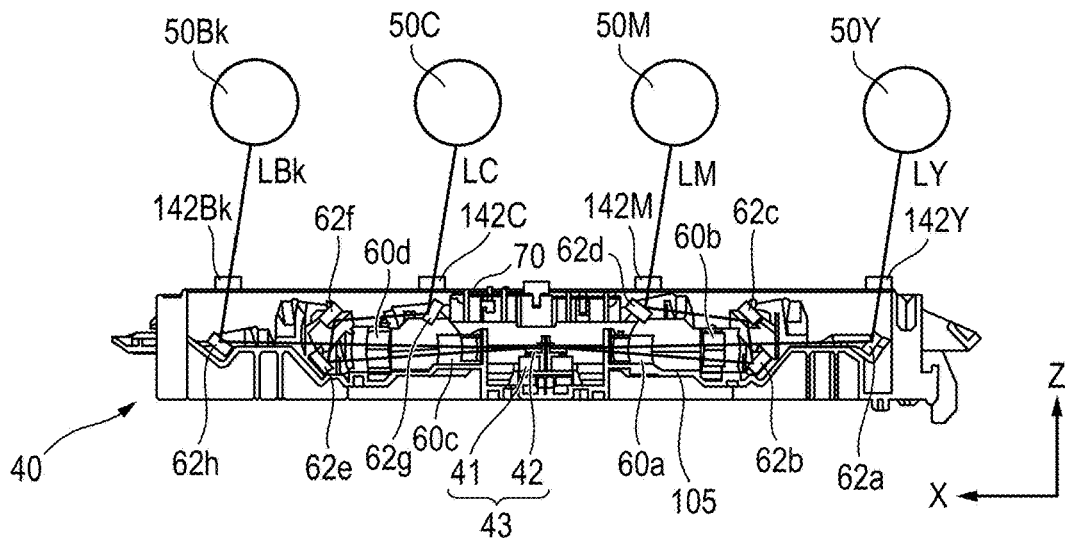

FIG. 2A is a view illustrated so as to make the inside of a housing 105 visible by removing a cover 70 (FIG. 2B), and is a view for illustrating a configuration of the first embodiment. In the inside and the outer periphery of the light scanning apparatus 40, a light source unit 51, in which a light source configured to emit a light beam is mounted, and the deflector 43, which is configured to reflect and deflect a light beam, are provided. Further, in the inside of the light scanning apparatus 40, an optical lens 60 (60a to 60d) and a reflection mirror 62 (62a to 62h) that are needed for guiding a light beam to the surface of the photosensitive drum 50 to form an image are provided.

The light beams deflected by the rotary polygon mirror 42 are configured to pass through first optical lenses 60a and 60c having strong power in the main scanning direction (Y-axis direction) and then be guided to second optical lenses 60b and 60d having strong power in a sub scanning direction (X-axis direction). The light beams having passed through the first optical lenses 60a and 60c and the second optical lenses 60b and 60d are each reflected at least once by the reflection mirror 62 and guided to the photosensitive drum 50 being the member to be scanned to form an image.

FIG. 2B is a schematic view for illustrating an entire image of mounting of the optical components. The light scanning apparatus 40 includes the housing 105 and the cover 70 for covering an opening at the top of the housing 105. In the inside and the outer periphery of the light scanning apparatus 40, the light source unit 51, in which the light source configured to emit a light beam is mounted, and the deflector 43, which includes a motor unit 41 and the rotary polygon mirror 42, and is configured to deflect a light beam, are provided. Further, in the light scanning apparatus 40, the plurality of optical lenses 60 (60a to 60d) and the plurality of reflection mirrors 62 (62a to 62h) for guiding each of light beams to the top of the photosensitive drum 50 to form an image are provided. The housing 105 has a mounted surface, on which the deflector 43 is mounted, and a support surface, on which a support portion configured to support at least one reflection mirror of the reflection mirrors 62a to 62h is formed, and which is located closer to the photosensitive drum 50 (photosensitive member) than the rotary polygon mirror 42.

A light beam LY corresponding to a photosensitive drum 50Y emitted from the light source unit 51 is deflected by the rotary polygon mirror 42 and enters the optical lens 60a. The optical lens 60a is an optical element that the light beam LY enters first among the lenses and the mirrors arranged on the optical path of the light beam LY. An optical axis of the optical lens 60a is in a direction substantially parallel to the X axis illustrated in FIG. 1. The light beam LY having passed through the optical lens 60a enters the optical lens 60b, and passes through the optical lens 60b to be reflected by the reflection mirror 62a. The light beam LY reflected by the reflection mirror 62a scans the photosensitive drum 50Y through a dustproof glass 142Y.

A light beam LM corresponding to a photosensitive drum 50M emitted from the light source unit 51 is deflected by the rotary polygon mirror 42 and enters the optical lens 60a. The optical lens 60a is an optical element that the light beam LM enters first among the lenses and the mirrors arranged on the optical path of the light beam LM. The light beam LM having passed through the optical lens 60a enters the optical lens 60b, and passes through the optical lens 60b to be reflected by the reflection mirrors 62b, 62c, and 62d. The light beam LM reflected by the reflection mirror 62d scans the photosensitive drum 50M through a dustproof glass 142M.

A light beam LC corresponding to a photosensitive drum 50C emitted from the light source unit 51 is deflected by the rotary polygon mirror 42 and enters the optical lens 60c. The optical lens 60c is an optical element that the light beam LC enters first among lenses and the mirrors arranged on the optical path of the light beam LC. An optical axis of the optical lens 60c is in a direction substantially parallel to the X axis illustrated in FIG. 1. The optical lens 60a and the optical lens 60c in the light scanning apparatus of the first embodiment are provided in the housing 105 such that the optical axis of the optical lens 60c and the optical axis of the optical lens 60a are parallel to each other. The light beam LC having passed through the optical lens 60c enters the optical lens 60d, and the light beam LC having passed through the optical lens 60d is reflected by the reflection mirrors 62e, 62f, and 62g. The light beam LC reflected by the reflection mirror 62g scans the photosensitive drum 50C through a dustproof glass 142C.

A light beam LBk corresponding to the photosensitive drum 50Bk emitted from the light source unit 51 is deflected by the rotary polygon mirror 42 and enters the optical lens 60c. The optical lens 60c is an optical element that the light beam LBk enters first among the lenses and the mirrors arranged on the optical path of the light beam LBk. The light beam LBk having passed through the optical lens 60c enters the optical lens 60d, and passes through the optical lens 60d to be reflected by the reflection mirror 62h. The light beam LBk reflected by the reflection mirror 62h scans the photosensitive drum 50Bk through a dustproof glass 142Bk.

<Optical Path of Laser Beam>

FIG. 3 is a schematic view for illustrating an optical path of a laser beam emitted from a semiconductor laser 52 to the rotary polygon mirror 42. In the inside of the light scanning apparatus 40, the light source unit 51, the rotary polygon mirror 42, a cylindrical lens 55, the optical lens 60, the reflection mirror 62, and the like are provided.

The light source unit 51 includes the semiconductor laser 52, a collimator lens 53, and a diaphragm 54, and diffused light emitted from the semiconductor laser 52 is converted to parallel light by the collimator lens 53. A Laser beam emitted from the light source unit 51 is collected on the rotary polygon mirror 42 by the cylindrical lens 55. As described above, the light beams deflected by the rotary polygon mirror 42, are configured to pass through the first optical lenses 60a and 60c having strong power in the main scanning direction and then be guided to the second optical lenses 60b and 60d having strong power in the sub scanning direction. The light beam reflected by the reflection mirror 62 passes through the dustproof glass 142 provided on the cover 70 and is guided to the photosensitive drum 50 being the member to be scanned, to form an image.

Figure 4A:
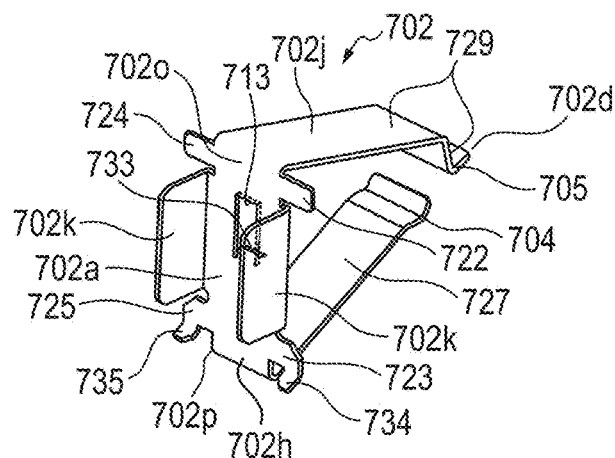
FIG. 4A, FIG. 4B and FIG. 4C are a configuration view of a leaf spring according to the first embodiment and a configuration view of a spring support member and a mirror support member in the first embodiment, respectively.
Figure 4C:
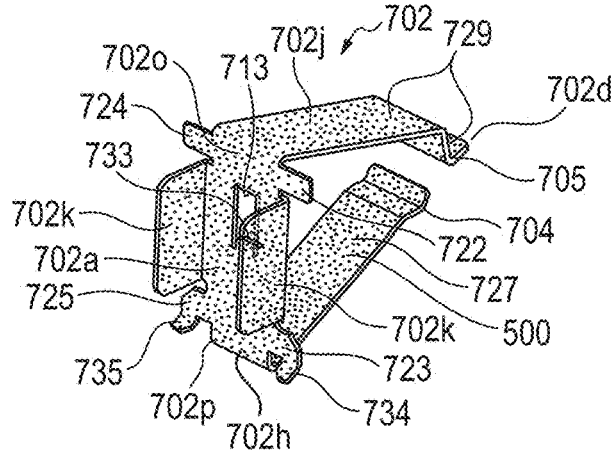
Figure 4B:
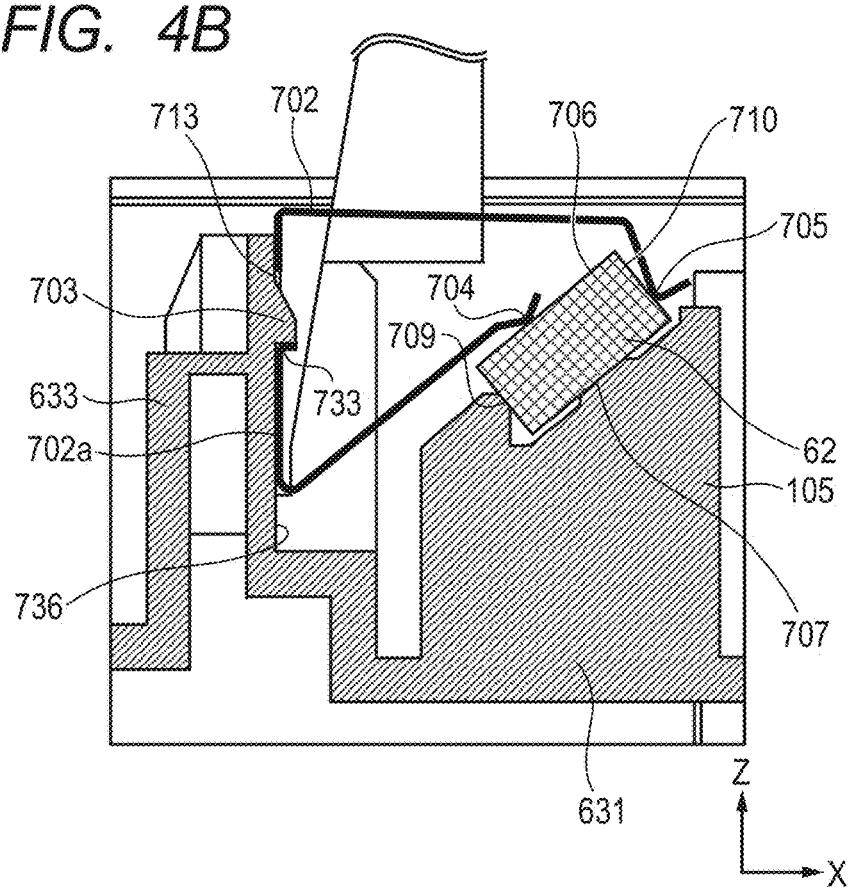

The reflection mirror 62 is fixed to the housing 105 with use of a leaf spring 702 (FIG. 4B). The leaf spring 702 is configured so as to urge the reflection mirror 62 in two directions, namely, a normal direction and a transverse direction of a reflection surface of the reflection mirror 62, while not urging the reflection mirror 62 in a longitudinal direction of the reflection surface of the reflection mirror 62. With such a configuration, the reflection mirror 62 is prevented from being deformed due to a difference in linear expansion between the housing 105 and the reflection mirror 62 at the time of a temperature rise.

<Configuration of Leaf Spring>

The leaf spring 702 being an elastic member illustrated in FIG. 4A is formed by bending one thin plate. The leaf spring 702 has a first plate portion 702h, which is a plate portion having a reference surface 702a, and a second plate portion 727 being a second arm portion, a third plate portion 702j being a first arm portion, and a pair of fourth plates 702k, which are separately bent with respect to the first plate portion 702h.

The first plate portion 702h is a contact portion that is in contact with a protruding portion 633 (FIG. 4B described later) being a second support portion described later and receives repulsing force from the protruding portion 633. The first plate portion 702h and the second plate portion 727 are coupled by a bent portion 702p. The bent portion 702p is formed by folding the second plate portion 727 from one end of the first plate portion 702h toward the first plate portion 702h to form a substantially V shape. Then, the bent portion 702p is elastically deformed to change the relative positional relationship (relative angle) between the first plate portion 702h and the second plate portion 727. The second plate portion 727 extends toward the other end side of the first plate portion 702h on the opposite surface to the reference surface 702a. The first plate portion 702h and the third plate portion 702j are coupled to each other by a bent portion 702o. The bent portion 702o is formed by bending the third plate portion 702j at substantially a right angle to the first plate portion 702h, and the bent portion 702o is elastically deformed to change the relative positional relationship (angle) between the first plate portion 702h and the third plate portion 702j. The pair of fourth plates 702k are bent at substantially a right angle from both lateral ends of the first plate portion 702h to the opposite side to the second plate portion 727 and the third plate portion 702j.

The reference surface 702a is one surface of the thin plate-like first plate portion 702h and abuts against a spring reception surface 736 of the protruding portion 633 provided in the housing 105 to serve as a reference of the position of the leaf spring 702 (FIG. 4B). A first press portion 704 for pressing the reflection mirror 62 is formed in the second plate portion 727. The first press portion 704 is a portion that is bent convexly so as to protrude at the end portion of the second plate portion 727 to the opposite side to the first plate portion 702h. The second plate portion 727 and the first plate portion 702h of the leaf spring 702 are inserted between the reflection mirror 62 and the protruding portion 633 under a deflected (shrunk) state against elastic force so that the first press portion 704 abuts against a mirror reflection surface 706 (FIG. 4B) of the reflection mirror 62. The mirror reflection surface 706 is a surface at which a light beam enters the reflection mirror 62. With this configuration, the first press portion 704 presses the reflection mirror 62 toward a first mirror bearing surface 707 being a second contact portion of a mirror support portion 631 that is a first support portion described later (FIG. 4B). The first mirror bearing surface 707 is in contact with a second surface parallel to the mirror reflection surface 706 of the reflection mirror 62.

A second press portion 705 for pressing the reflection mirror 62 is formed in the third plate portion 702j. The second press portion 705 being the press portion is a portion in a dogleg shape formed by bending an end portion 702d of the third plate portion 702j in a direction to the second plate portion 727 and further bending the end portion 702d at substantially a right angle in the opposite direction to the second plate portion 727. A part of the third plate portion 702j, the portion of the third plate portion 702j that is bent at an obtuse angle, and a part of the second press portion 705 form a second press arm 729. The second press portion 705 abuts against a mirror flat surface 710 being a predetermined surface of the reflection mirror 62 (FIG. 4B). The leaf spring 702 is locked to the protruding portion 633 while the third plate portion 702j of the leaf spring 702 is deflected with respect to the first plate portion 702h against elastic force. With this configuration, the second press portion 705 elastically presses the reflection mirror 62 to a second mirror bearing surface 709 that is a first contact portion of the mirror support portion 631 being a support portion (FIG. 4B). The second mirror bearing surface 709 is in contact with a first surface parallel to the mirror flat surface 710 (the rear surface of the first surface) of the reflection mirror 62.

A hole portion 713 is an opening provided on the reference surface 702a and penetrates the first plate portion 702h between the front and rear surfaces thereof. In the hole portion 713, an engagement portion 733 (leaf spring-side engagement portion) is formed of a part of the first plate portion 702h that forms the hole portion 713, the engage portion 733 being engaged with an engagement portion 703 (housing-side engagement portion) of the protruding portion 633. The first plate portion 702h has protruding flat portions 722 and 724 protruding on both sides between the pair of fourth plates 702k and the bent portion 702o that is folded toward the third plate portion 702j. Further, the first plate portion 702h has protruding flat portions 723 and 725 protruding on both sides between the pair of fourth plates 702k and the bent portion 702p that is folded toward the second plate portion 727. The end portions of the protruding flat portions 723 and 725 are bent to the opposite side to the second plate portion 727 to form stoppers 734 and 735. The stoppers 734 and 735 abut against a surface (not shown) of the protruding portion 633. Thus, even when the pressing of the leaf spring 702 onto the guide surface by a jig described later is not released with some cause, the leaf spring 702 can be prevented from moving down.

As thus described, the leaf spring 702 is configured so as to engage the engagement portion 733 formed in the leaf spring 702 itself to the engagement portion 703 provided in the housing 105. With this configuration, the leaf spring 702 can hold its posture without falling off the housing 105 due to the repulsing force from the reflection mirror 62. Although symbols of the respective portions of the leaf spring 702 are shown in FIG. 4A, detailed symbols of the leaf spring 702 are omitted in the other drawings for easiness to see the drawings. The shape of the leaf spring according to the first embodiment is not limited to the shape of FIG. 4A.

<Configuration of Spring Support Member and Mirror Support Member>

As illustrated in FIG. 4B, the protruding portion 633 and the mirror support portion 631 are integrally molded inside the housing 105, the protruding portion 633 being a leaf spring support portion configured to support the leaf spring 702, the mirror support portion 631 supporting the reflection mirror 62 for accurately mounting the reflection mirror 62 to the housing 105. The protruding portion 633 is a gap forming portion configured to form a gap with respect to the reflection mirror 62 supported on the mirror support portion 631 described later. In the Y-axis direction of the protruding portion 633, a Y-axial width of the protruding portion 633 is formed in the housing 105 so as to be slightly narrower than the pair of fourth plates 702k of the leaf spring 702. The protruding portion 633 is inserted between the pair of fourth plates 702k when the leaf spring 702 is inserted between the reflection mirror 62 and the protruding portion 633 from a +Z-axis direction to perform the function of guiding the leaf spring 702. Further, the spring reception surface 736 of the protruding portion 633 is in contact with the reference surface 702a of the leaf spring 702 when the leaf spring 702 is engaged with the engagement portion 703 of the housing 105.

The mirror support portion 631 has the first mirror bearing surface 707 and the second mirror bearing surface 709 that abut against the reflection mirror 62 pressed by the first press portion 704 and the second press portion 705 of the leaf spring 702. The first mirror bearing surface 707 supports the rear surface side of the mirror reflection surface 706 against a pressed point in the reflection mirror 62 that is pressed by the first press portion 704 of the leaf spring 702. A process for mounting the leaf spring 702 to the housing 105 is described later with use of FIG. 11A, FIG. 11B, and FIG. 11C.

<Material for Separated Material>

At the time of fixing the reflection mirror 62 mounted on the mirror support portion 631 with use of the leaf spring 702, the housing 105 may be scraped off by the leaf spring 702 to generate a separated material. The separated material is a material separated from the housing when the housing is scraped off due to mounting operation for a variety of components. The separated material is made of the same material as the housing 105 because the separated material is generated by the housing 105 being scraped off. The housing 105 in the first embodiment contains, for example, polyphenylene ether (PPE) and polystyrene resin (PS). Further, a specific gravity of the resin used for the housing 105 of the first embodiment is, for example, 1.36 g/cm$^3$. Typically, a resin having almost a similar specific gravity is used for the housing.

<Collecting Portion>

In the first embodiment, a collecting portion (a catching portion) configured to collect (catch) the separated material is formed by applying an adhesive onto the leaf spring 702. That is, the leaf spring 702 itself becomes the collecting portion. A method of applying the adhesive onto the leaf spring 702 involves, for example, immersing the leaf spring 702 into an adhesive solution and then pulling up the leaf spring 702 for drying. Thus, the adhesive is applied onto the entire leaf spring 702 to form the collecting portion. As indicated by dots in FIG. 4C, the adhesive 500 is applied on the entire leaf spring 702. When a plurality of kinds of leaf springs are used for one housing 105, a collecting portion is desirably provided by applying the adhesive to all of the leaf springs. However, the leaf spring 702 provided with the collecting portion may be used as particularly limited to some leaf springs in the case of fixing an optical component with a small spot diameter on the surface, for example.

<Verification of Influence on Image by Separated Material>

Figure 5:
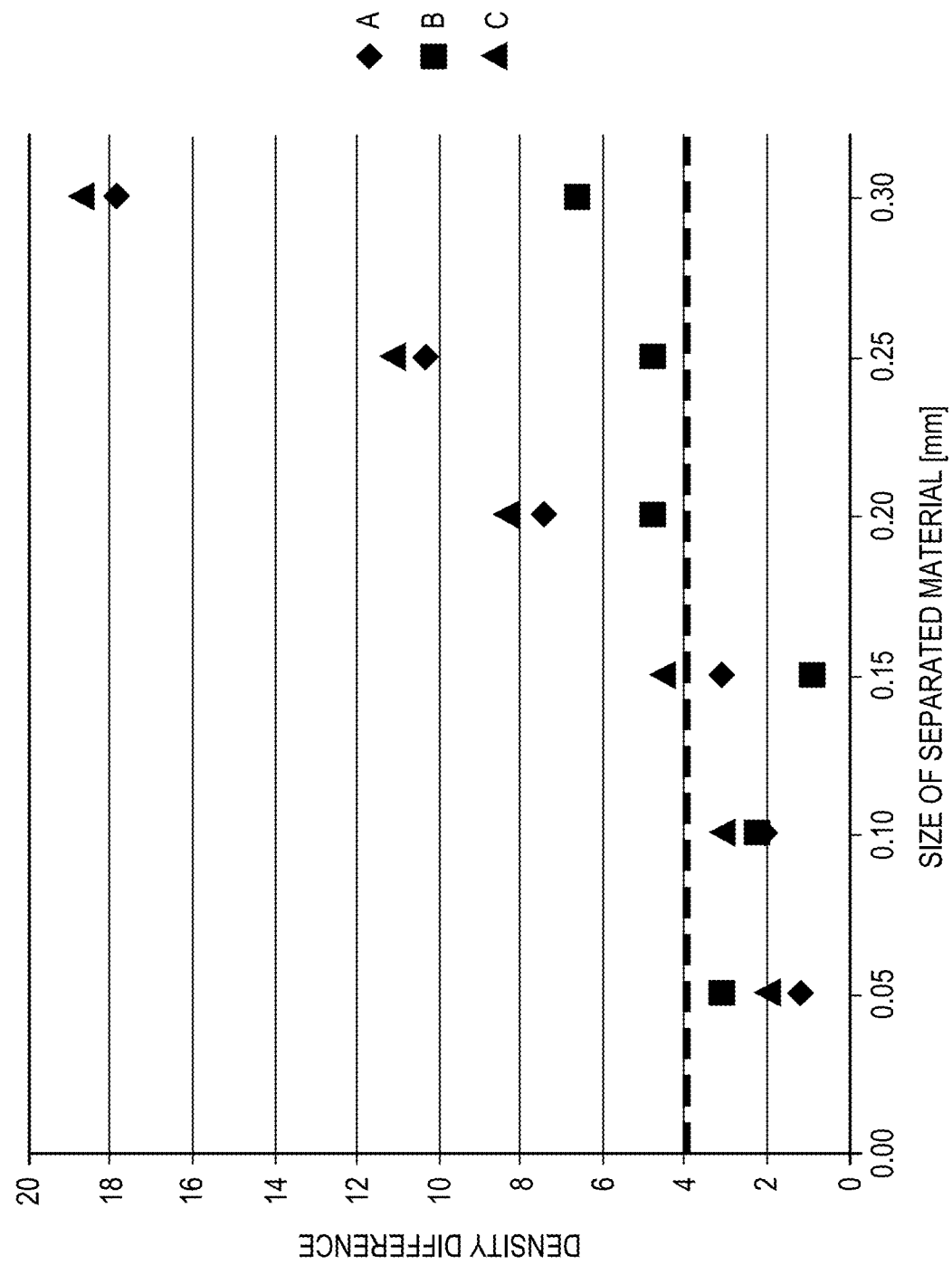
FIG. 5 is a graph for showing a relationship between a size of a separated material and a density difference in each of the first to third embodiments.

At the time of mounting the reflection mirror 62 to the housing 105 with use of the leaf spring 702, a separated material is generated due to rubbing between the leaf spring 702 and the housing 105. FIG. 5 is a graph for showing a size of a separated material being a separated material on the optical component and a density difference between an image with a density to be essentially formed and a white streak generated due to the separated material in each of a plurality of light scanning apparatus with different placement of the optical components. In FIG. 5, a horizontal axis indicates the size (mm) of the separated material, and a vertical axis indicates the density difference. The density difference is a difference between a density of an image in which a latent image is formed by a laser beam having passed through a region without a separated material and a density of a region in which a latent image is formed by a laser beam having passed through a region with a separated material. A broken line at the density difference of 4 indicates a permissible value of the density difference such that a white streak is easily viewed when the density difference is not smaller than 4 and a white streak cannot be viewed when the density difference falls below 4. A, B, and C in FIG. 7 indicate different light scanning apparatus referred to as a product A, a product B, and a product C in the following.

Figure 6:
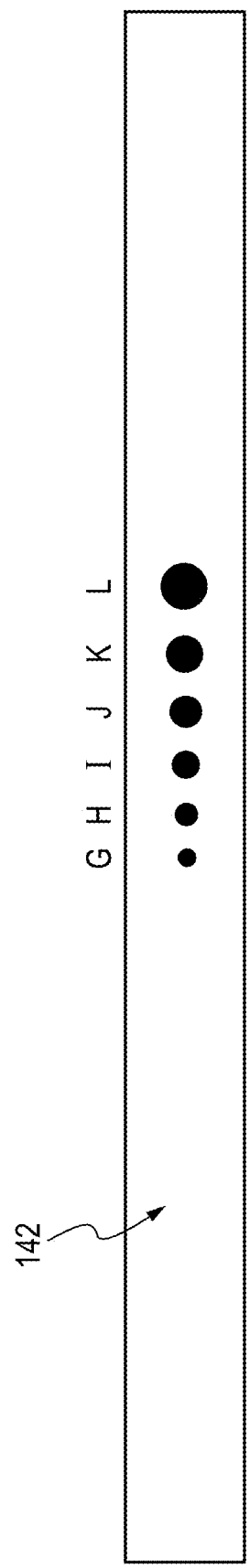
FIG. 6 is a diagram for illustrating a light shielding chart in the first to third embodiments.
Figure 7:
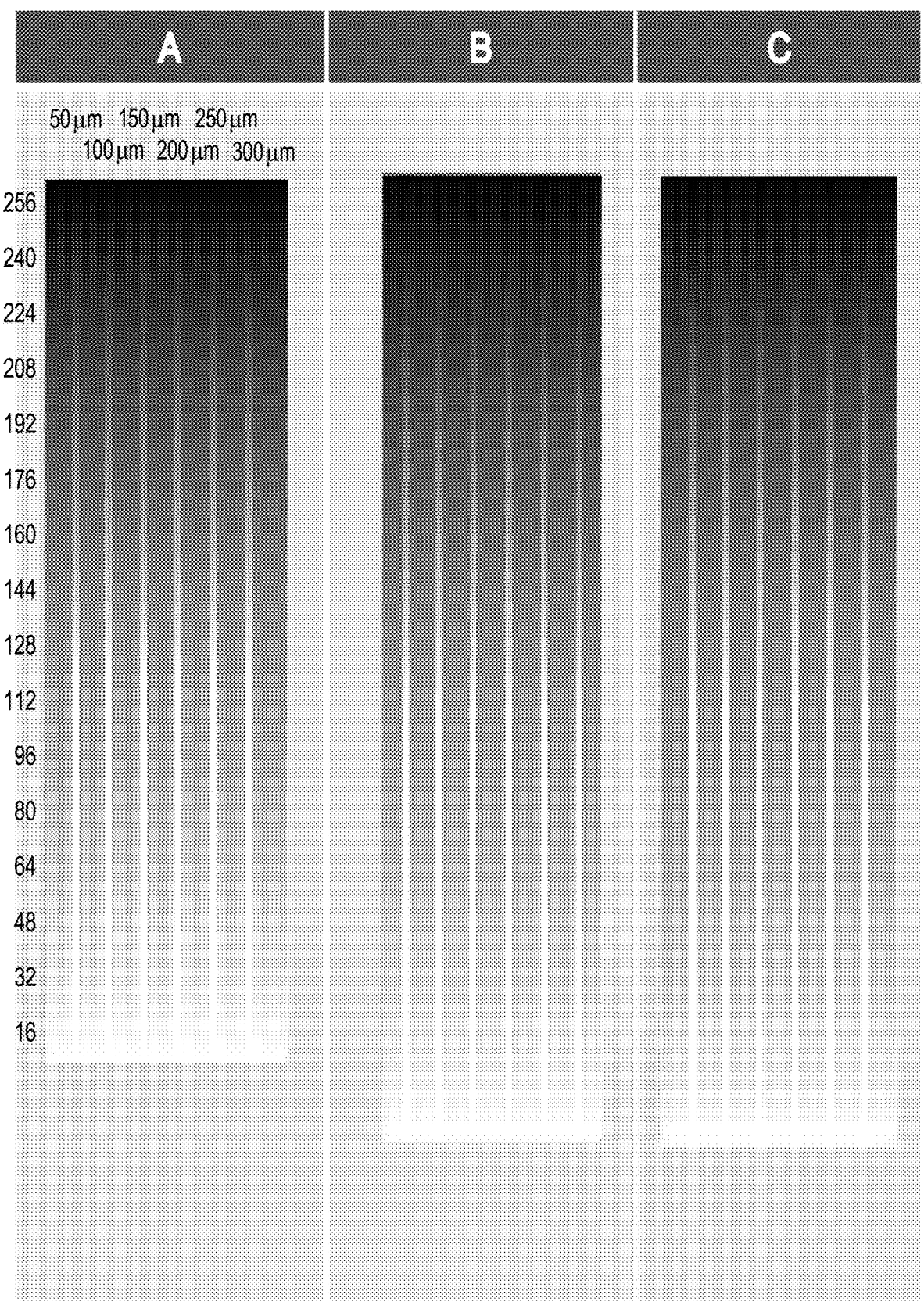
FIG. 7 is a diagram for illustrating a result of an image output for a product in each of the first to third embodiments.

FIG. 6 is a diagram for illustrating a light-shielding chart provided on the dustproof glass 142. Symbols G to L above the dustproof glass 142 denote light-shielding parts corresponding to separated materials with different sizes, and light-shielding portions with six sizes from a line width of from 50 μm to 300 μm are provided in the main scanning direction at an interval of 50 μm. FIG. 7 is obtained by assembling the dustproof glass 142 provided with such a light-shielding chart to each of the product A, the product B, and the product C to form images with different densities (hereinafter also referred to as "test charts"). White streaks are generated on the test charts due to the light-shielding parts corresponding to separated materials. The largest difference between a white streak part (hereinafter referred to as "white streak portion") and a black part at each gradation in an image is used as a density difference.

In measurement for evaluating the test charts of FIG. 7, ES-1000G (Seiko Epson Corporation) was used as an image reader. The evaluation was performed on measurement conditions of 256-level (8-bit) grayscale, a 300-dpi resolution, and a black image. In FIG. 7, for example in the product A, 16 densities out of densities of the 256 gradations are extracted and a density difference between the black image and the white streak portion at each gradation is measured. There are six points of light-shielding parts corresponding to the separated materials with different sizes at each density as illustrated in FIG. 6, and hence density differences are measured at a total of 96 points. Then, six points at a gradation with the largest density difference among the measured 96 points are plotted in the graph of FIG. 5. The same applies to the product B and the product C. As seen from FIG. 5, in any one of the products, the density difference falls below 4, which is a permissible value for the density difference, when the separated material has a size of smaller than 100 μm, and hence the white streak is hardly viewed. For this reason, the adhesive to be used needs to have adhesive force by which a separated material with a size of not smaller than 100 μm can be collected.

Figure 8:
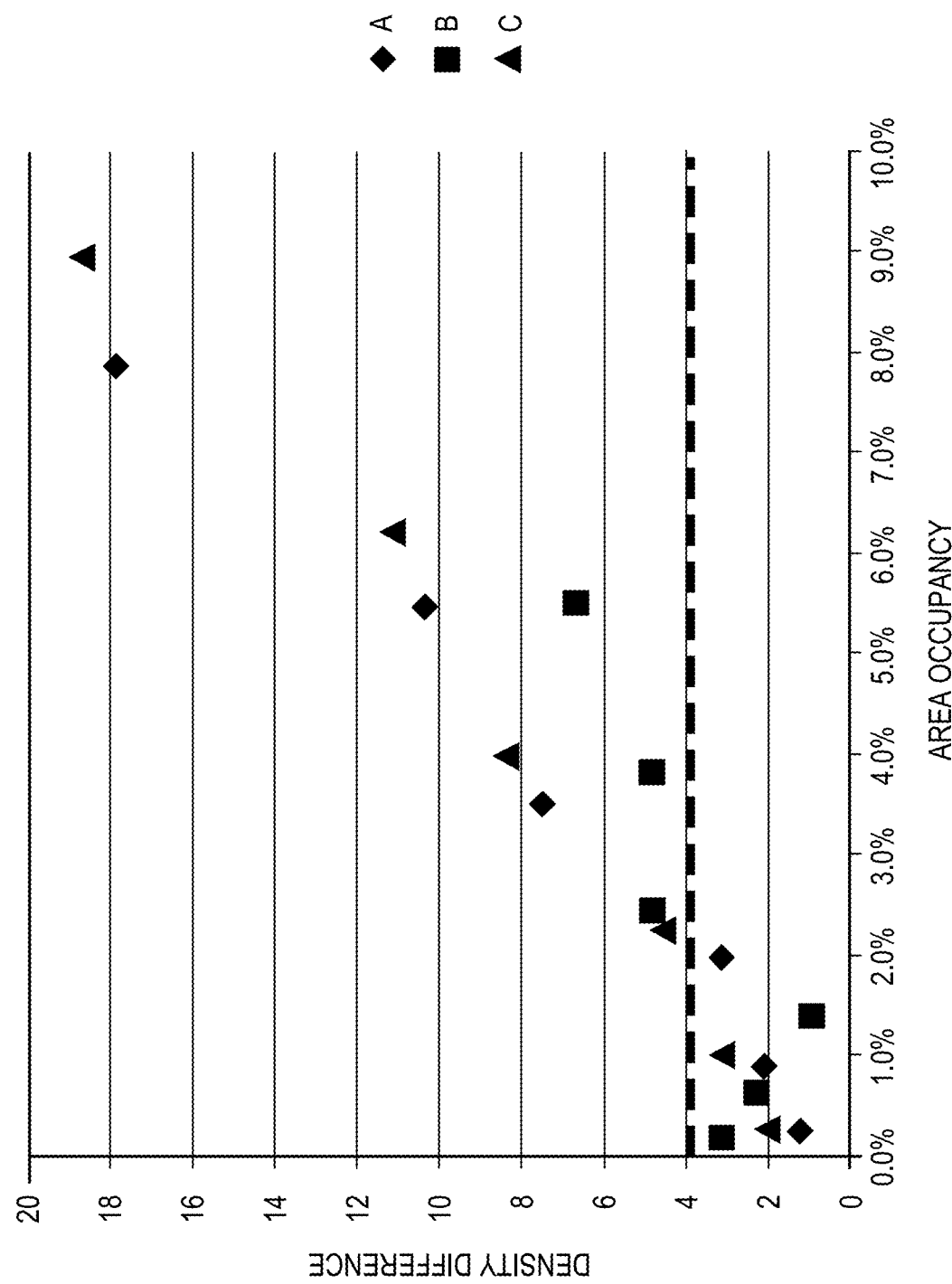
FIG. 8 is a graph obtained by normalizing the graph of FIG. 5 for each of the first to third embodiments.

FIG. 8 is a graph obtained by normalizing the graph of FIG. 5 by taking a laser spot diameter into consideration. The position of an optical element differs and the spot diameter on the optical element differs depending on the product, and hence a horizontal axis indicates an area occupancy of the separated material, which is an area of the separated material with respect to an area of the spot on the optical element. The optical element is an element corresponding to the dustproof glass 142 in the first embodiment. A vertical axis and a broken line at the density difference of 4 in FIG. 8 are the same as those in FIG. 5. The separated material with a size of not smaller than 100 μm, which was a target in the first embodiment, corresponds to dimensions of about 1% of the spot diameter on the optical element. That is, the optical element is not limited to the dustproof glass 142, and an image defect can be prevented as long as a separated material corresponding to the dimensions of about 1% of the spot diameter on the optical element can be collected.

The adhesive force of the collecting portion is set from the dimensions of the separated material mounted thereto. In the first embodiment, the adhesive force of the collecting portion was set so that the separated material does not fall when one 0.19-mg piece of the same material as that of the housing 105 is placed on the collecting portion (leaf spring) without pressurization, and the collecting portion is turned upside-down such that a self-weight of the separated material is directed in a peeling direction from the collecting portion. In the material for the housing 105, this is a mass with which a diameter of the separated material is 642 μm on the assumption of the separated material being a sphere, and is sufficient adhesive force for collecting the separated material with a size of 100 μm that causes an image defect. At the same time, this is adhesive force not to impair the sliding properties of the housing 105 and the leaf spring 702 and not to affect the assembling property. In addition, many of separated materials that can be generated in an assembly process of the light scanning apparatus 40 have sizes of not larger than 400 µm. A separated material with a size of 400 µm is easily found by visual observation, and for example when the separated material is visually observed at the time of assembly, an operator can perform the operation of removing the separated material with use of a blower or the like.

Herein, the shape of the separated material that adheres to the adhesive of the leaf spring 702 is assumed to be a sphere. The shape of the connecting portion between the leaf spring 702 and the separated material is assumed to be a circle. Further, a radius "r" of the circle being the contact portion at the time when the separated material comes into contact with the leaf spring 702 is assumed to be 1% of a radius R of the separated material assumed to be the sphere (r=0.01× R). For example, when the radius of the separated material is 200 µm, the radius "r" of the circle being the contact portion between the leaf spring 702 and the separated material is 2 µm, which is 1% of 200 µm. A lower limit of the adhesive force (N/µm$^2$) per unit area of the adhesive is obtained as follows. First, assuming that a density of the separated material, namely, the material forming the housing 105, is ρ (kg/µm$^3$), a mass Md (kg) of the separated material is obtained from the following expression (1):

$$Md = 4/3 \times \pi \times R^3 \times \rho \qquad (1),$$

where π is a circumference ratio. A weight Fg (N) that acts when the collecting portion is turned upside-down such that the self-weight of the separated material is directed in the peeling direction from the collecting portion is obtained from the next formula (2):

$$Fg = Md \times g = 4/3 \times \pi \times R^3 \times \rho \times g \qquad (2),$$

where "g" is a gravitational acceleration (=9.8 m/s$^2$=9.8×10$^6$ µm/s$^2$).

An area Sc (µm$^2$) of the contact portion is obtained from the next formula (3):

$$Sc = \pi \times r^2 \qquad (3).$$

From the above, a lower limit of an adhesive force F (N/µm$^2$) per unit area of the adhesive is obtained from the following formula (4):

$$\begin{aligned} F = Fg/Sc &= \\ &(4/3 \times \Pi \times R^3 \times \rho \times g)/(\Pi \times r^2) \\ &= 4/3 \times R^3/r^2 \times \rho \times g. \end{aligned} \qquad (4)$$

For example, assuming that R=200 µm, "r"=2 µm (=0.01 R), ρ=1.36×10$^{-15}$ kg/µm$^3$ (=1.36 g/µm$^3$), and "g"=9.8×10$^6$ µm/s$^2$, $$\begin{aligned} F &= 4/3 \times (200)^3/(2)^2 \times 1.36 \times 10^{-15} \times 9.8 \times 10^6 \\ &\approx 35.5 \times 10^{-3} \text{ N/µm}^2. \end{aligned}$$

In such a manner as above, the lower limit of the adhesive force F per unit area of the adhesive is obtained.

<Material for Adhesive of Collecting Portion>

For the adhesive to be applied onto the leaf spring 702, for example, an acrylic ester type substance is preferably used. For the adhesive in the first embodiment, an acrylic ester type copolymer mixture is used. The material used as the adhesive to be applied onto the leaf spring 702 is not limited to the material described above, but may be a substance that holds stickiness without being cured after applied onto the leaf spring 702. As thus described, according to the first embodiment, it is possible to collect a separated material that is generated at the time of assembly in the source of generation of the separated material.

[Second Embodiment]

In the first embodiment, the adhesive has been applied onto the leaf spring 702 to form the collecting portion, but in a second embodiment of the present invention, a configuration in which the collecting portion is provided on the housing 105 side is described. A collecting portion 111 is provided in the housing 105. The collecting portion 111 is formed by applying an adhesive for optical use onto the surface of the housing 105 and drying the adhesive. In a related-art product, there has been an example in which a drying lubricant is applied between the reflection mirror 62 and the leaf spring 702, but this has no stickiness and thus no function of collecting the separated material.

<Collecting Portion>

Figure 9A:
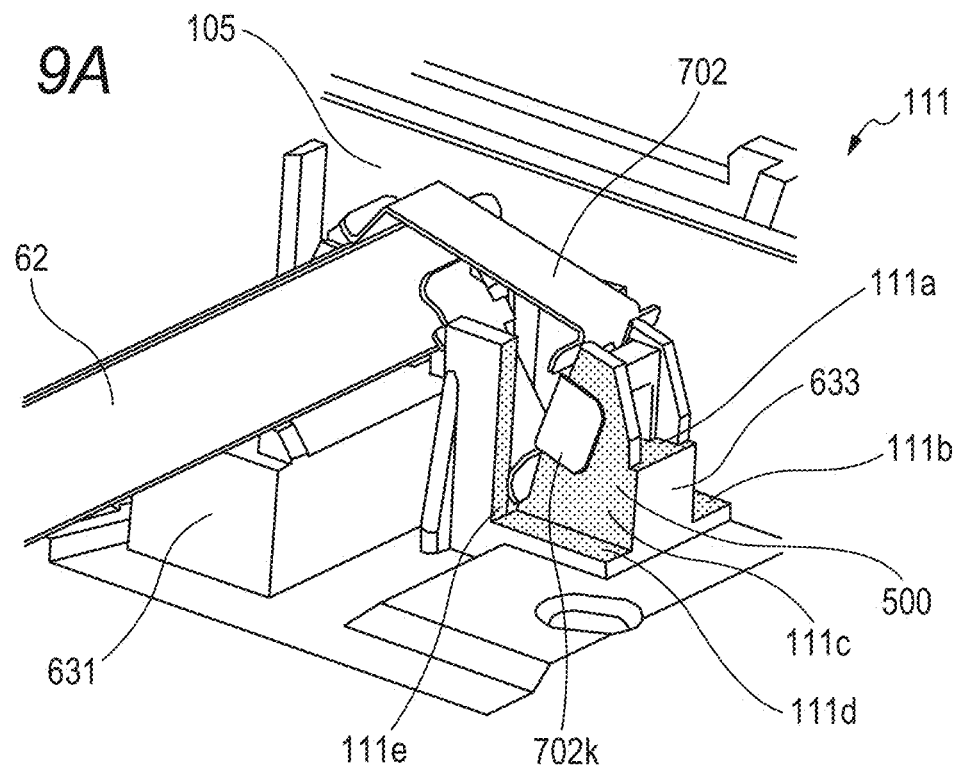
FIG. 9A and FIG. 9B are perspective views of a collecting portion in the second embodiment.
Figure 9B:
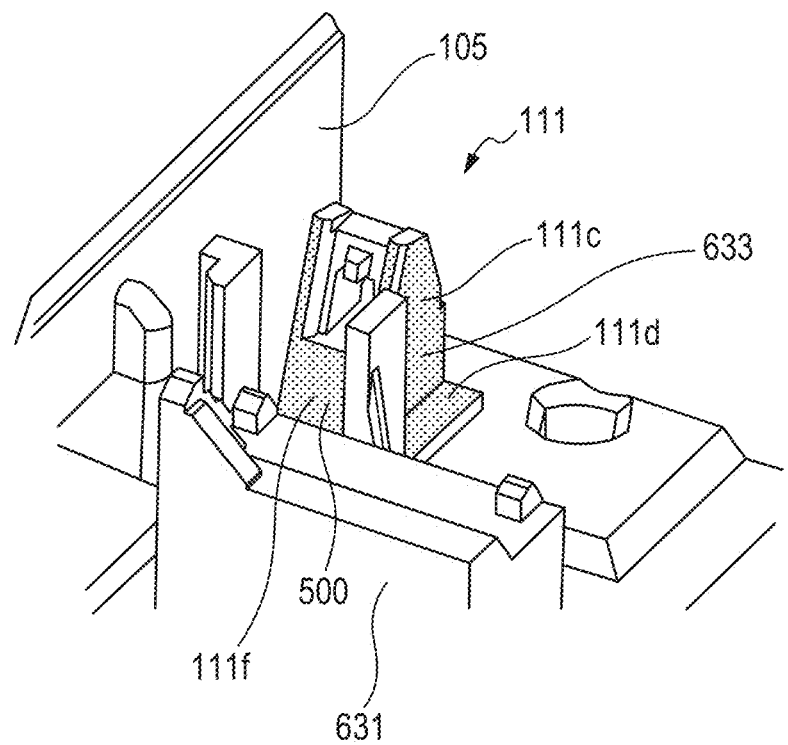
Figure 10:
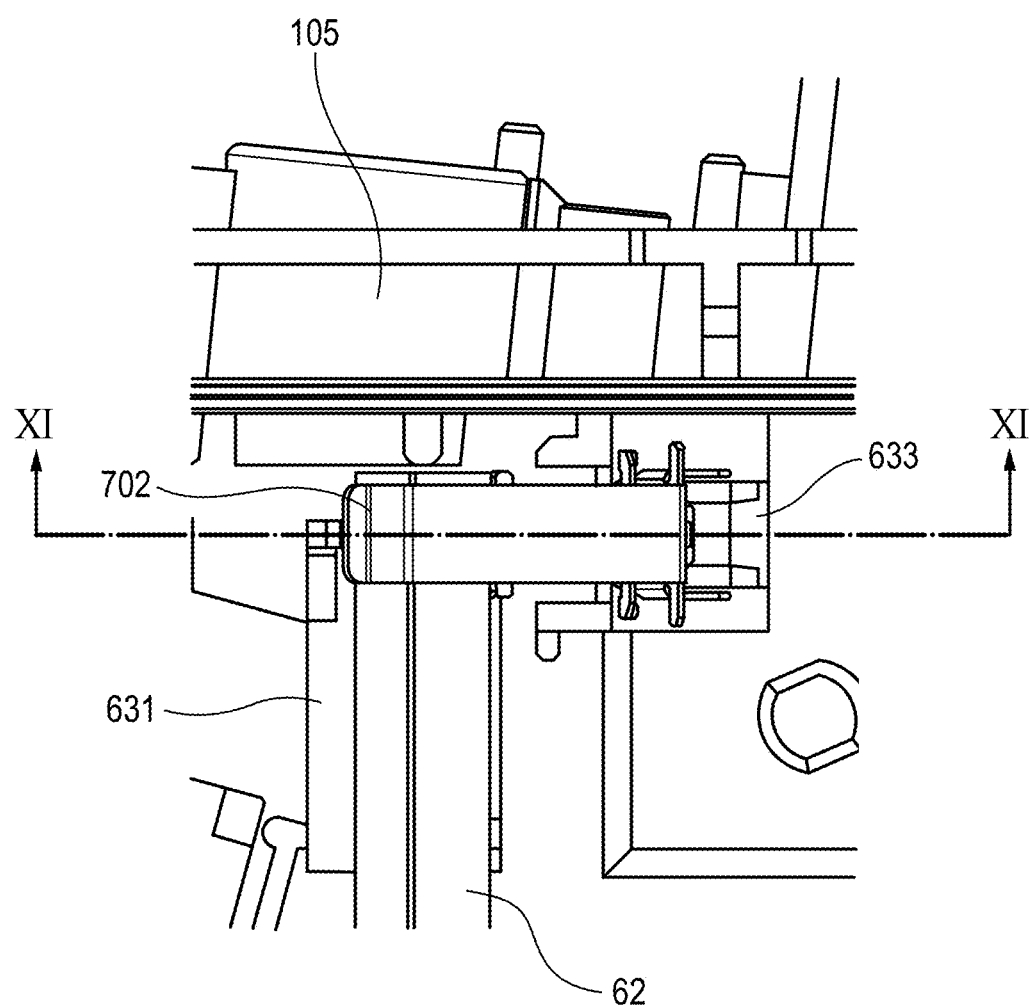
FIG. 10 is a top view of a leaf spring part according to the second embodiment.
Figure 11A:
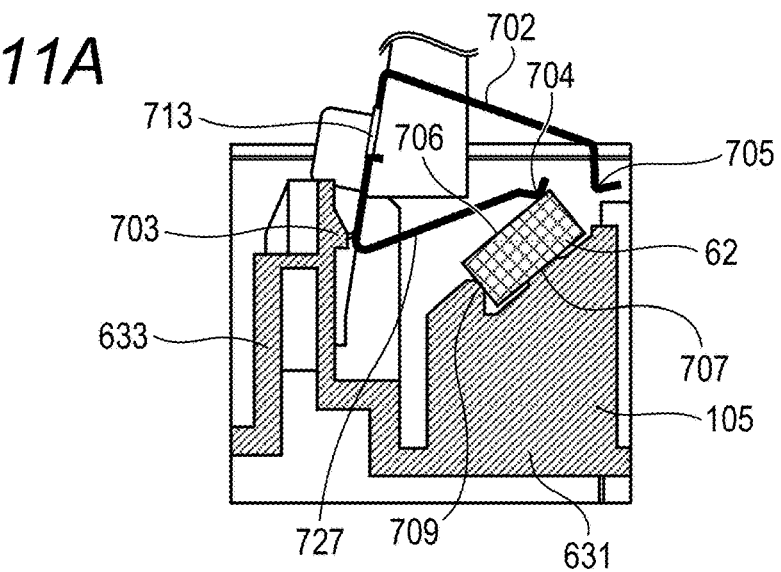
FIG. 11A, FIG. 11B, and FIG. 11C are sectional views for illustrating a mounting process for the leaf spring according to the second embodiment.
Figure 11B:
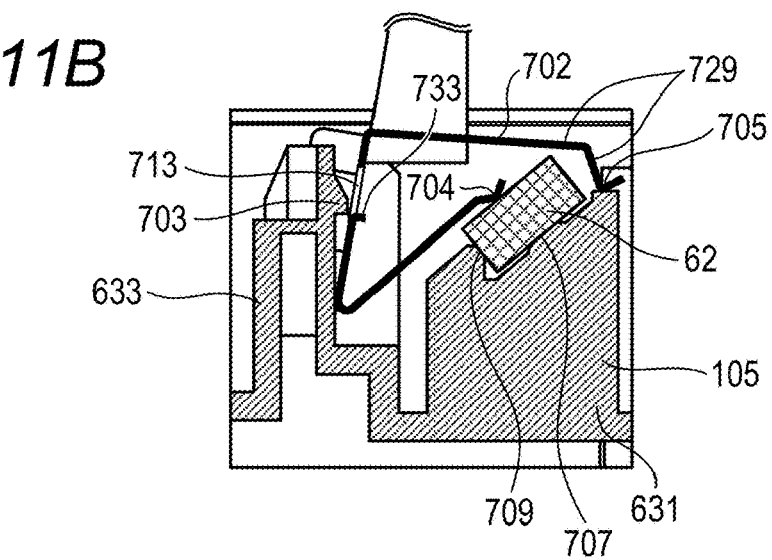
Figure 11C:
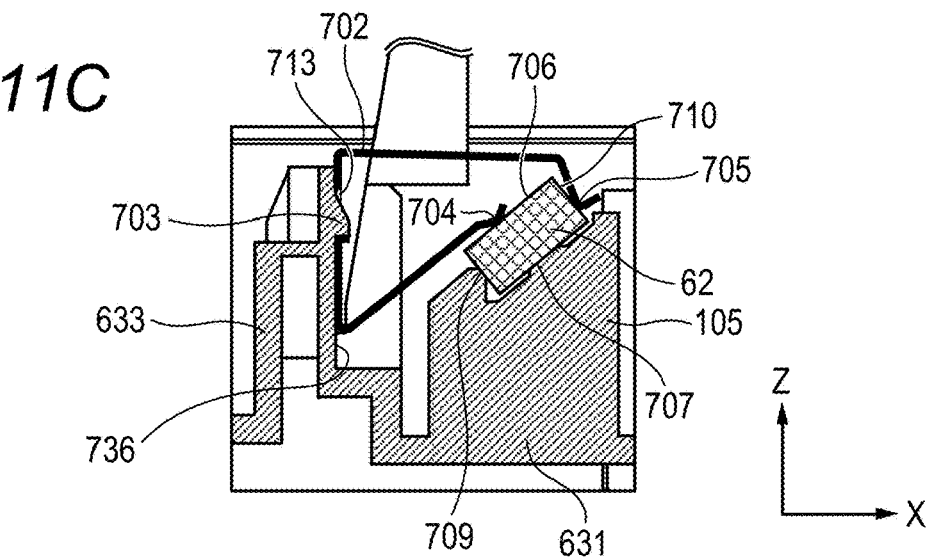

FIG. 9A and FIG. 9B are views for illustrating a region in which the collecting portion 111 is provided on the housing 105. As indicated by dots in FIG. 9A and FIG. 9B, the collecting portion 111 comprises adhesive 500 applied on the protruding portion 633. FIG. 9A is a view for illustrating a state in which the reflection mirror 62 is mounted to the housing 105 with use of the leaf spring 702. FIG. 9B is a view obtained by removing the reflection mirror 62 and the leaf spring 702 from FIG. 9A so as to improve the visibility of the collecting portion 111 provided in the protruding portion 633. The collecting portion 111 is provided on the surface of the housing 105, and is provided in a region in which the collecting portion 111 slides with the leaf spring 702 when the leaf spring 702 is inserted. That is, the collecting portion 111 of the second embodiment is provided in the protruding portion 633 configured to support the leaf spring 702. FIG. 10 is a top view of FIG. 9A seen from a +Z direction. FIG. 11A, FIG. 11B, and FIG. 11C are views for illustrating a mounting process of the leaf spring 702, as well as sectional views along the line XI-XI of FIG. 10 described later. In FIG. 11A, the leaf spring 702 inserted from above (+ side of the Z direction) is elastically deformed and gets over the engagement portion 703 (FIG. 11A). Thereafter, the elastic deformation is released and the engagement portion 733 of the leaf spring 702 is hooked on the engagement portion 703 so as to prevent falling of the leaf spring 702 (snap fit system) (FIG. 11B). The leaf spring 702 is inserted downward in FIG. 11C under a state in which the force generated by the elastic deformation acts between the housing 105 and the leaf spring 702 (FIG. 11C). As a result, the housing 105 is scraped off to generate a separated material, but as illustrated in FIG. 9B, the separated material is collected in a collecting portion 111f. As a result, the separated material does not move in the housing 105.

Further, in the snap fit system, a clearance between the leaf spring 702 and the housing 105 is large and the posture of the leaf spring 702 at the time of insertion varies, and thus the bent portion 702p being an edge portion of the leaf spring 702 may slide with the housing 105 to generate a separated material. Similarly, however, the separated material is collected by the collecting portion 111. In the second embodiment, the pair of fourth plates 702k of the leaf spring 702 may slide with the housing 105. However, the separated material is collected by a collecting portion 111c. Further, the collecting portion 111 may be provided in such a position as collecting portions 111a, 111b, 111d, and 111e as illustrated in FIG. 9A.

Although one leaf spring 702 has been focused and described in the second embodiment, a plurality of leaf springs are typically provided in the housing 105. When the collecting portion is provided with respect to the protruding portion being a support portion of each of all the leaf springs, the frequency of generation of the image defect can be further reduced. The collecting portion may be provided in any one of the housing 105 and the leaf spring 702, or may be provided in both of the housing 105 and the leaf spring 702. As thus described, according to the second embodiment, it is possible to collect a separated material that is generated at the time of assembly without causing deterioration in assembling property.

[Third Embodiment]

In a third embodiment of the present invention, a configuration in which the leaf spring is fixed to the housing with a screw or the like to mount the optical element to the housing will be described. The collecting portion of the third embodiment collects a separated material that is generated when a screw is screwed into a screw hole in the case of fixing the leaf spring to the housing with the screw.

Figure 12:
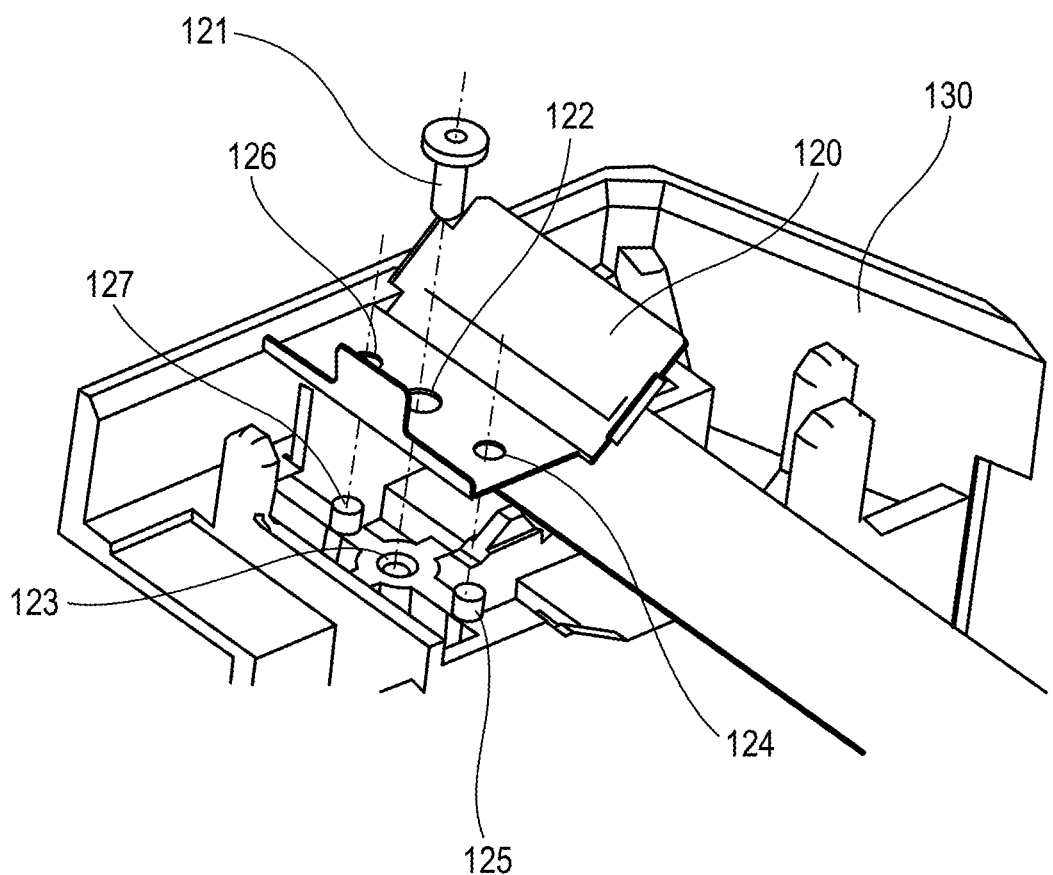
FIG. 12 is a perspective view for illustrating mounting of a leaf spring according to the third embodiment.
Figure 13:
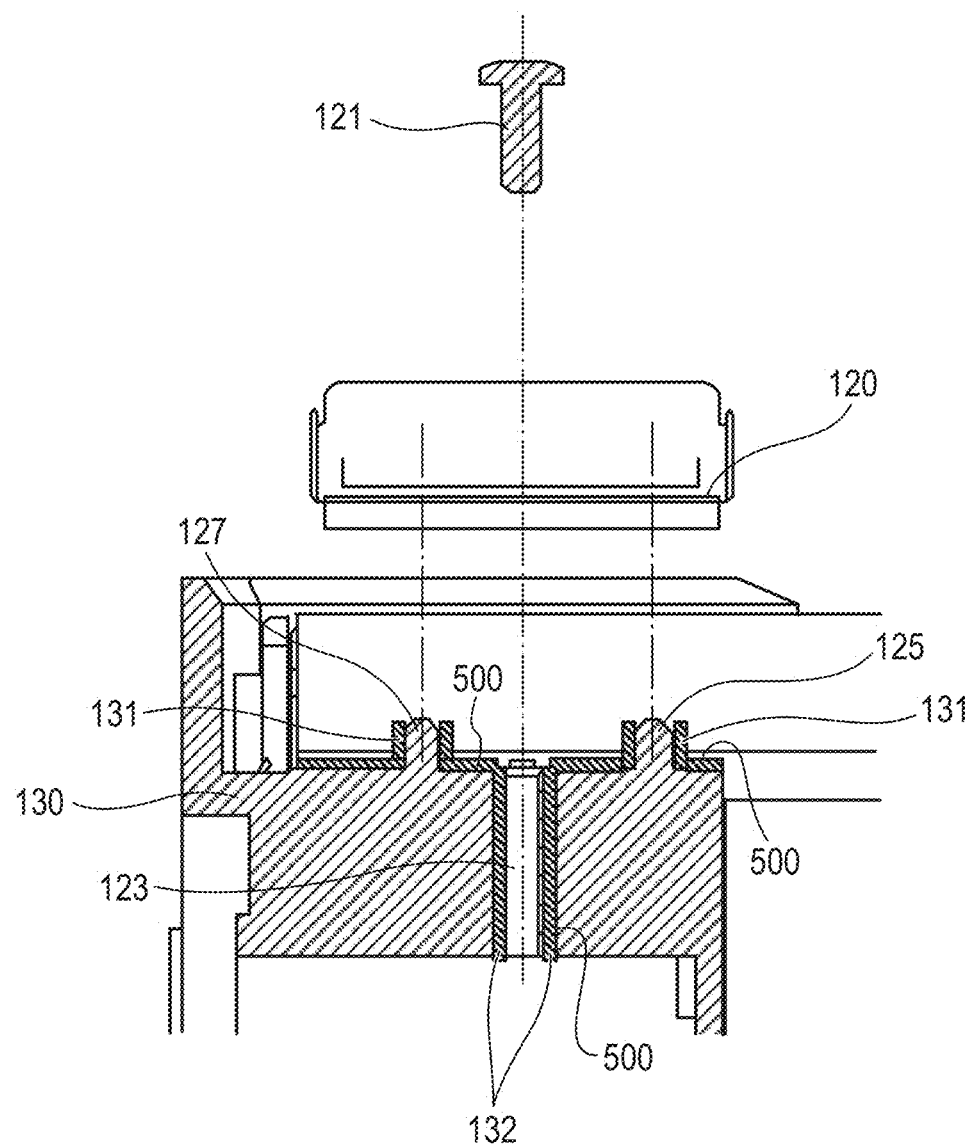
FIG. 13 is a sectional view for illustrating a collecting portion in the third embodiment.

FIG. 12 is an example in which a leaf spring 120 is fixed to a housing 130 with a self-tap screw 121 (hereinafter referred to as "screw 121"). FIG. 13 is a sectional view taken along a line passing through a screw hole 123 in FIG. 12. The leaf spring 120 is positioned by fitting of a round hole 124 into a boss 125 and a long round hole 126 into a boss 127. The leaf spring 120 is then fixed to the housing 130 with the screw 121. In this case, the leaf spring 120 and the bosses 125 and 127 slide to cause generation of a separated material. For collecting this separated material, a collecting portion 131 is provided on the surfaces of the boss 125 and the boss 127. The collecting portion 131 comprises adhesive 500 applied on the surfaces of the boss 125 and the boss 127.

Further, the screw 121 enters the housing 130 while scraping off the housing 130 to thereby generate a separated material. Particularly, due to the screw hole 123 being a through hole, the separated material may fall on the rear surface side of the housing 130. This increases the possibility that the separated material is deposited in the process to be mixed. For collecting such a separated material, the collecting portion 132 is provided inside the screw hole 123. The collecting portion 132 comprises adhesive 500 applied on the inner surface of the screw hole 123. The collecting portion may also be provided inside the screw hole 123 and in a region in which the housing 130 is exposed from a hole portion 122, which is provided in the leaf spring 120 and through which the screw 121 passes. The collecting portion is not restrictively provided on the leaf spring configured to fix the reflection mirror 62, but may, for example, be provided around the screw hole for fixing the rotary polygon mirror to the housing. As thus described, according to the third embodiment, it is possible to collect a separated material that is generated at the time of assembly without causing deterioration in assembling property. According to the third embodiment, it is possible to collect a separated material at a place at which the separated material is generated at the time of assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-046525, filed Mar. 10, 2017, which is hereby incorporated by reference herein in its entirety.

What is claimed is:

1. A light scanning apparatus, comprising:
   a light source configured to emit a laser beam to expose a photosensitive drum;
   a rotary polygon mirror configured to deflect the laser beam emitted from the light source;
   a reflection mirror configured to guide the laser beam deflected by the rotary polygon mirror to the photosensitive drum to be scanned;
   a housing containing the rotary polygon mirror and the reflection mirror; and
   a leaf spring configured to press the reflection mirror toward the housing to fix the reflection mirror to the housing,
   wherein an adhesive is applied to the leaf spring, the adhesive being configured to adhere separated material scraped from the housing, the separated material being scraped from the housing by rubbing between the leaf spring and the housing at a time of fixing the reflection mirror to the housing.

2. A light scanning apparatus according to claim 1, wherein the adhesive comprises a substance which maintains stickiness without being cured after applied onto the leaf spring.

3. A light scanning apparatus according to claim 2, wherein the adhesive comprises an acrylic ester type substance.

4. A light scanning apparatus according to claim 1, wherein the housing includes polyphenylene ether and polystyrene resin.

5. A light scanning apparatus, comprising:
   a light source configured to emit a laser beam to expose a photosensitive drum;
   a rotary polygon mirror configured to deflect the laser beam emitted from the light source;
   a reflection mirror configured to guide the laser beam deflected by the rotary polygon mirror to the photosensitive drum to be scanned;
   a housing containing the rotary polygon mirror and the reflection mirror;
   a leaf spring configured to press the reflection mirror toward the housing to fix the reflection mirror to the housing;
   a leaf spring support portion provided in the housing and configured to support the leaf spring; and
   a catching portion configured to catch a separated material scraped off from the housing by rubbing between the leaf spring and the leaf spring support portion at a time of fixing the reflection mirror to the housing,
   wherein the catching portion is formed by applying an adhesive to the leaf spring support portion.

6. A light scanning apparatus according to claim 5, wherein the adhesive comprises a substance which maintains stickiness without being cured after applied onto the leaf spring support portion.

7. A light scanning apparatus according to claim 6, wherein the adhesive comprises an acrylic ester type substance.

8. A light scanning apparatus according to claim 5, wherein the housing includes polyphenylene ether and polystyrene resin.

9. A light scanning apparatus according to claim 5, wherein the leaf spring support portion is formed integrally with the housing.

10. A light scanning apparatus according to claim 9, wherein the reflection mirror is supported by the leaf spring support portion.

* * * * *